Jan. 22, 1957 E. PETERSON 2,778,392
ROLLER GAGE MEANS FOR PORTABLE LUMBER SAW MILL
Filed Dec. 10, 1954 6 Sheets-Sheet 1

INVENTOR.
EMIL PETERSON
BY
Patrick D. Beavers
ATTORNEY

Jan. 22, 1957 E. PETERSON 2,778,392
ROLLER GAGE MEANS FOR PORTABLE LUMBER SAW MILL
Filed Dec. 10, 1954 6 Sheets-Sheet 2
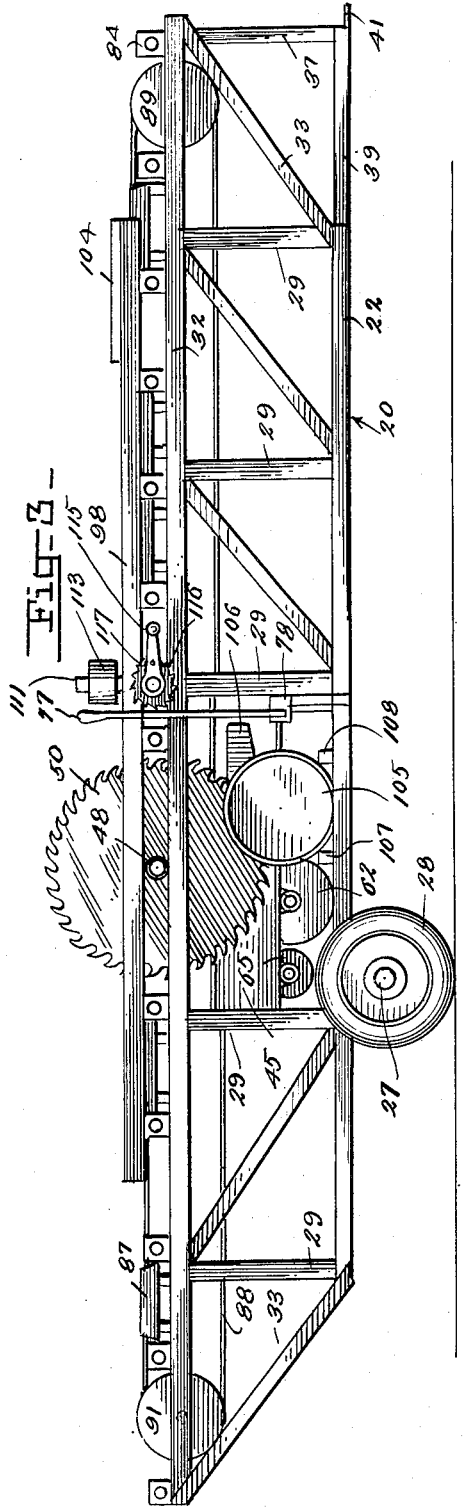
Fig-3-
Fig-19-
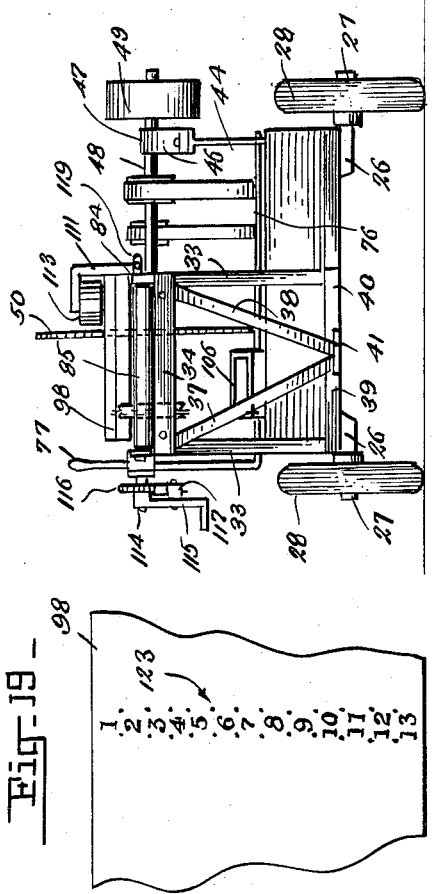
Fig-4-
INVENTOR.
EMIL PETERSON
BY
Patrick D Beavers
ATTORNEY

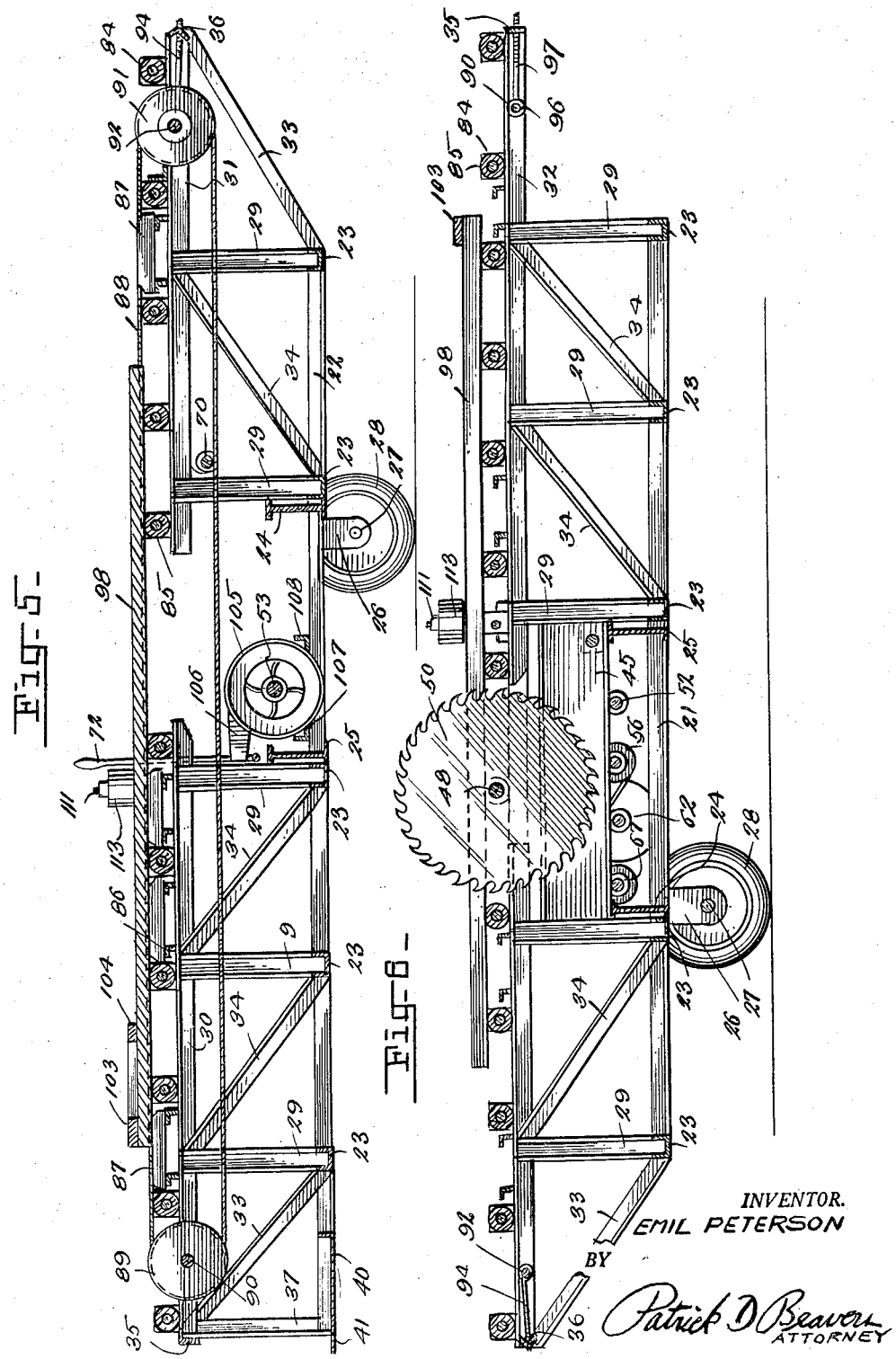

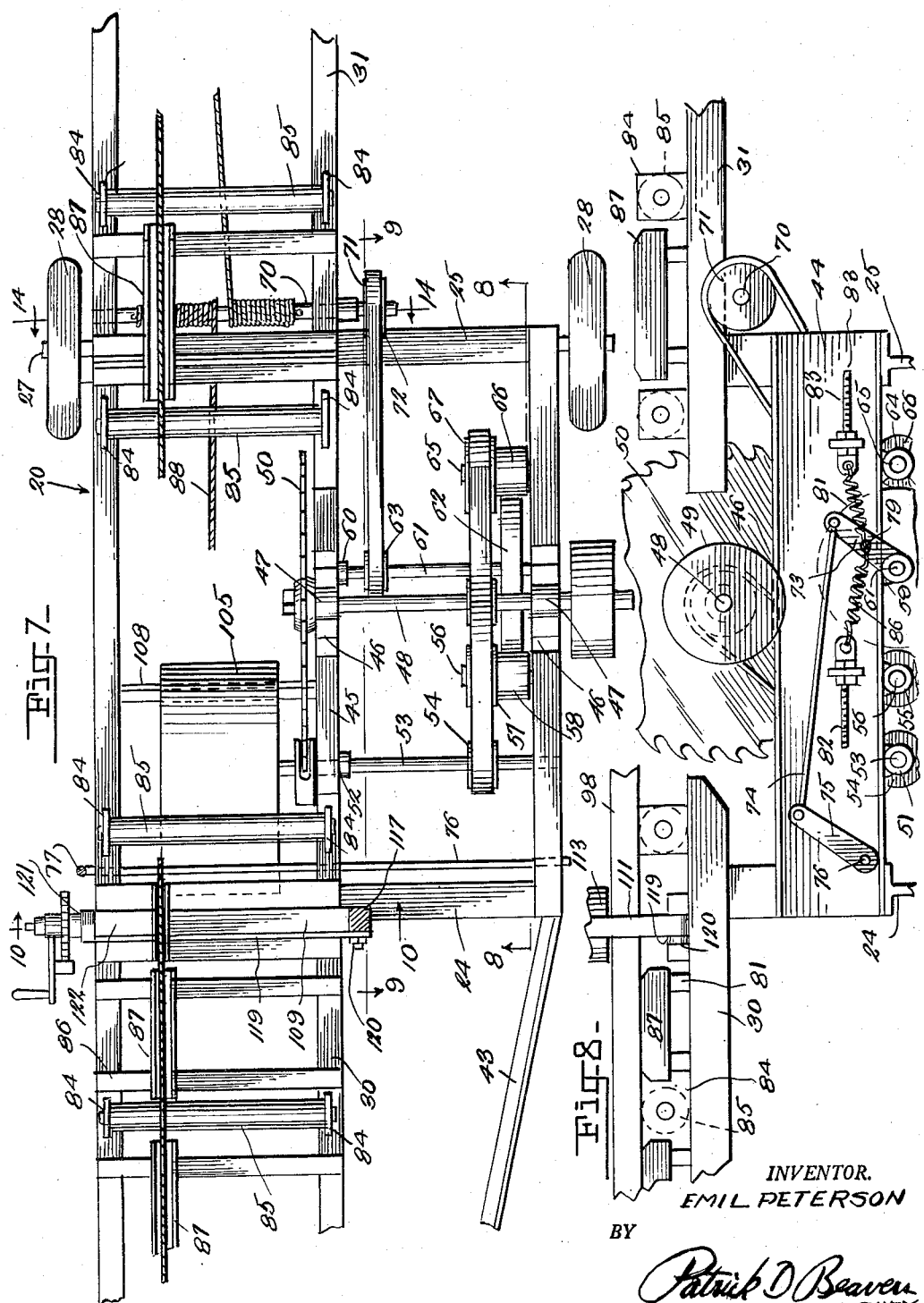

Jan. 22, 1957 E. PETERSON 2,778,392
ROLLER GAGE MEANS FOR PORTABLE LUMBER SAW MILL
Filed Dec. 10, 1954 6 Sheets-Sheet 5
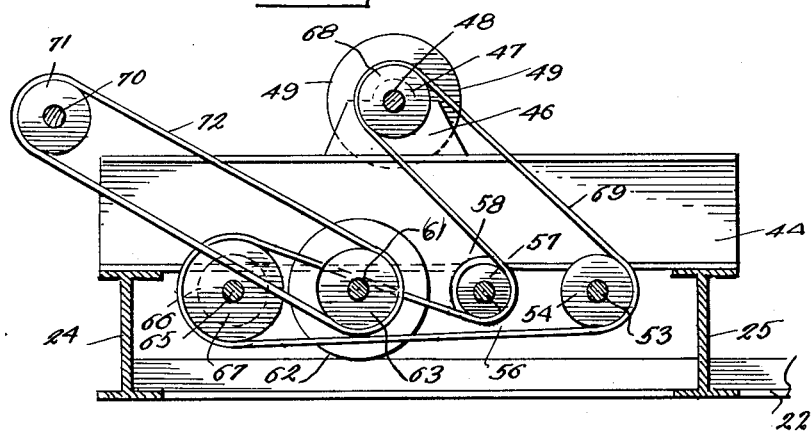
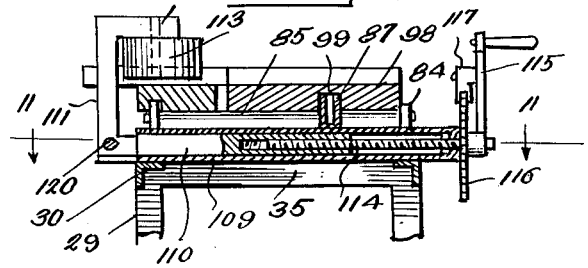
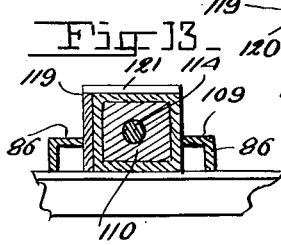
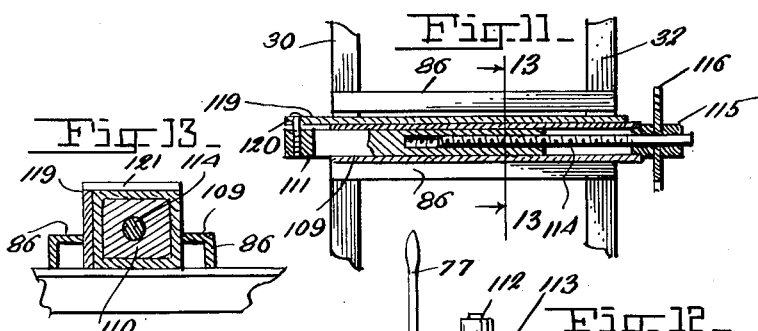
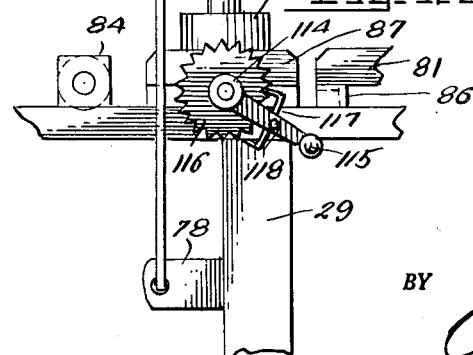
INVENTOR.
EMIL PETERSON
BY
Patrick D. Beavers
ATTORNEY Jan. 22, 1957   E. PETERSON   2,778,392
ROLLER GAGE MEANS FOR PORTABLE LUMBER SAW MILL
Filed Dec. 10, 1954   6 Sheets-Sheet 6
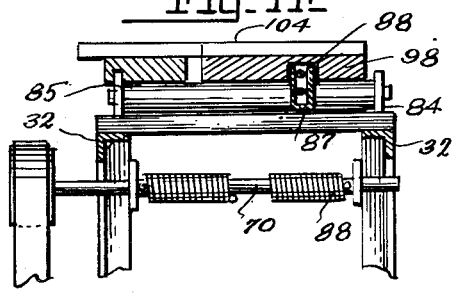
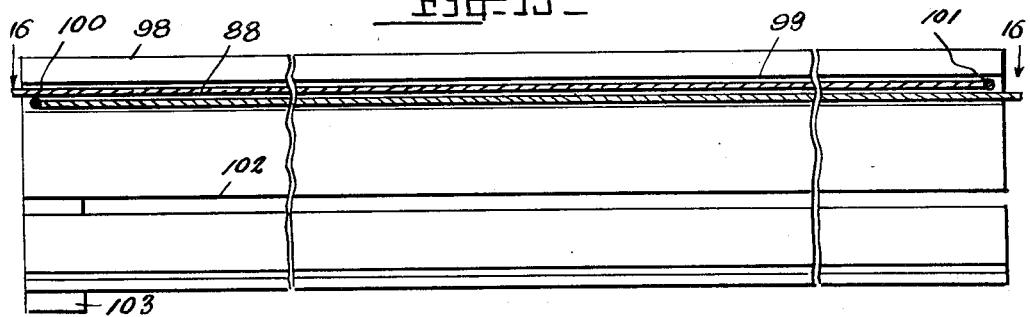
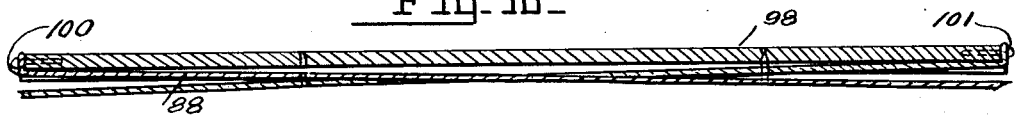
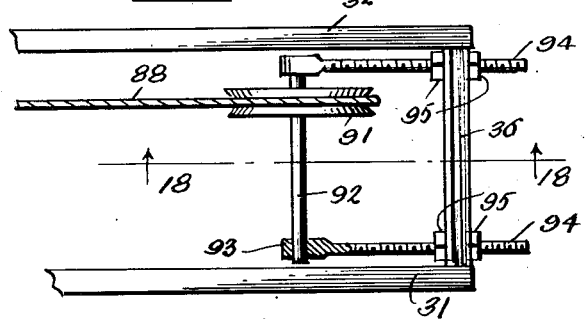
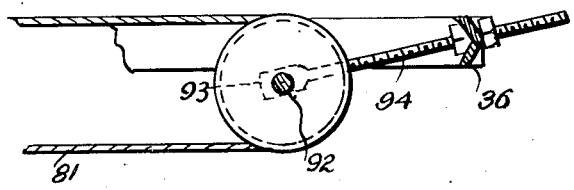
INVENTOR.
EMIL PETERSON
BY
Patrick D. Beavers
ATTORNEY

United States Patent Office

2,778,392
Patented Jan. 22, 1957

2,778,392

ROLLER GAGE MEANS FOR PORTABLE LUMBER SAW MILL

Emil Peterson, Middle River, Minn.

Application December 10, 1954, Serial No. 474,353

1 Claim. (Cl. 143—173)

This invention relates to improvements in saw mills, and more particularly to a portable saw mill.

The saw mill embodying the invention has not been designed for large scale operation, but for small scale operation such as a group of farmers that have second growth timber on their property who would find it to their advantage to cut the timber and convert it by means of the saw mill into useable lumber.

An important object of the invention, therefore, is to provide a small portable saw mill that is efficient in operation, maneuverable, and will rapidly cut lumber within the characteristics of the timber that is being used.

The saw mill is designed to be operated by the power take-off of a tractor, or any other equivalent device that can efficiently operate the saw mill.

Once the saw mill has been transported to the desired location it can be placed in operation in a very short period of time.

With the above and other objects and advantages in view the invention consists of the novel details of construction, arrangement and combination of parts more fully hereinafter described, claimed and illustrated in the accompanying drawings in which:

Fig. 1 is an elevational view of one side of the saw mill embodying the invention;

Fig. 2 is a top plan view of the saw mill;

Fig. 3 is an elevational view of the side of the saw mill opposite to the side shown in Fig. 1;

Fig. 4 is a front view of the saw mill;

Fig. 5 is a longitudinal sectional view on the line 5—5 of Fig. 2;

Fig. 6 is a longitudinal sectional view similar to Fig. 5, but looking in the opposite direction;

Fig. 7 is an enlarged detailed fragmentary sectional view of the circular saw and the operating mechanism therefor;

Fig. 8 is a detailed fragmentary sectional view on the line 8—8 of Fig. 7;

Fig. 9 is a detailed fragmentary sectional view on the line 9—9 of Fig. 7;

Fig. 10 is a detailed fragmentary sectional view on the line 10—10 of Fig. 7;

Fig. 11 is a detailed fragmentary sectional view on the line 11—11 of Fig. 10;

Fig. 12 is an elevational view, partly broken away, of the crank mechanism for operating the gauge wheel for determining the cut of the lumber;

Fig. 13 is a detailed fragmentary sectional view on the line 13—13 of Fig. 11;

Fig. 14 is a detailed fragmentary sectional view on the line 14—14 of Fig. 7;

Fig. 15 is a bottom plan view of the saw mill carriage;

Fig. 16 is a longitudinal sectional view on the line 16—16 of Fig. 15;

Fig. 17 is a detailed fragmentary elevational view of one of the cable pulleys for the operating cable of the saw mill carriage;

Fig. 18 is a detailed fragmentary sectional view on the line 18—18 of Fig. 17; and Fig. 19 (Sheet 2) is a detailed fragmentary elevational view of the cutting gauge on the saw mill carriage.

Referring more in detail to the drawings wherein like parts are designated by like reference numerals, the saw mill embodying the invention comprises a frame 20 which consists of two longitudinally extending parallel disposed frame members 21 and 22, respectively. Connecting the members 21 and 22 in spaced relation to each other are a plurality of transversely extending frame members 23 (Fig. 6). Rigidly secured to the members 21 and 22 in transverse relation thereto and extending outwardly of the frame member 21 are a pair of parallel disposed I beams 24 and 25, respectively. Secured to the I beams 24 are a pair of axle housings 26 for the axle 27 on which are rotatably mounted the ground engaging wheels 28.

Extending upwardly in vertical relation to the frame members 21 and 22 are a plurality of vertically disposed relatively spaced frame members 29. Secured to the upper end of the frame members 29 connected to the frame member 21 are longitudinally extending frame members 30 and 31, respectively, and these members are spaced from each other for a purpose to be later described. Secured to the upper end of the frame members 29 connected to the frame member 22 is a longitudinally extending frame member 32 and the frame members 30, 31 and 32 are in parallel spaced relation to each other.

The ends of the frame members 30, 31 and 32 extend outwardly of the frame members 21 and 22 and inwardly inclined diagonally disposed brace members 33 are connected to the outer ends of the frame members 30, 31 and 32. Diagonally disposed brace members 34 following the inclination of the diagonally disposed brace members 33 and connected between the frame members 30, 31 and 32.

At the front end of the saw mill, as shown in Fig. 4, the upper ends of the frame members 29 and the forward ends of the frame members 30 and 32 are connected by a plurality of transversely disposed frame members 35, the rear ends of the frame members 31 and 32 being connected by a V-shaped cross member 36. Depending below the brace member 34 in inwardly converging relation to each other are a pair of brace members 37 and 38, respectively.

Extending forwardly of the forward ends of the frame members 21 and 22 in converging relation to each other are a pair of brace members 39 and 40, respectively. The forward ends of the members 39 and 40 are connected to the lower ends of the members 37 and 38 and at their point of connection there is provided a hitch 41, the hitch 41 permitting the frame to be drawn by a tractor or any other suitable vehicle.

The outer ends of the I beams 24 and 25 are connected at their lower portions by a frame member 42, and a diagonally disposed brace member 43 extends from the outer end of the I beam 24 to the forward end of the frame member 21. Connected to the upper ends of the I beams 24 and 25 in parallel relation to the frame member 42 is another I beam 44 and a fourth I beam 45 is also connected to the upper edges of the I beams 24 and 25 in parallel relation to the I beam 44. The outer ends of the I beam 45 are connected to the frame members 29 below the space intermediate of the inner ends of the frame members 30 and 31, see Fig. 6, and brackets 46 having bearings 47 are mounted on the upper edges of the I beams 44 and 45.

Journalled in the bearings 47 is a shaft 48 on one end of which is mounted a drive pulley 49 and on the other end of which is mounted the circular saw 50. Bearings 51 and 52, respectively, are mounted on I beams 44 and 45, respectively, and a shaft 53 having a pulley 54 thereon is journalled in the bearings 51 and 52, respectively. See Fig. 7. A bearing 55 (Fig. 8) is mounted on the I beam 44 adjacent to the bearing 51 and a shaft 56 (Fig. 9), having idler pulleys 57 and 58 rotatably mounted thereon, is journalled in the bearing 55. Bearings 59 and 60 are positioned on the I beams 44 and 45, respectively, for journalling a shaft 61 therein, and pulleys 62 and 63, respectively, are mounted on the shaft 61. Another bearing 64 is mounted on the I beam 44 for the shaft 65 on which idler pulleys 66 and 67 are rotatably mounted.

A pulley 68 is mounted on the shaft 48 intermediate of the I beams 44 and 45 and a belt 69 is trained over pulleys 68, 54, 67 and 57, as shown in Fig. 9. A shaft 70 is journalled on a pair of frame members 29 adjacent the end of the I beam 45, and a pulley 71 mounted on the outer end of the shaft 70 is connected by a belt 72 with the pulley 63 on the shaft 61.

Secured to the outer end of the shaft 61 is a lever 73 (Figs. 1 and 8) which is connected by a link 74 to a similar lever 75 which is fixed on a shaft 76 which extends transversely of the frame 20 and an elongated handle 77 extends upwardly at right angles to the shaft 76 so that it is in a position to be manually operated by the saw mill operator. The bearings 59 and 60 eccentrically receive the shaft 61 so that the manipulation of the handle 77 will cause the pulley 62 to be moved into and out of frictional engagement with the pulleys 58 and 66. Thus, the pulley 62 will be caused to travel in a selected one of opposite directions, and thus control the direction of rotation of pulley 71 and shaft 70 for a purpose to be later described. The shaft 76 is journalled at one end in the I beam 44 and at the other end in a bracket 78 (Fig. 3) mounted on one of the frame members 29. The lever 73 is provided with a centrally located opening 79 to receive an end of the coil springs 80 and 81, respectively, which extend in opposite directions to each other so that the opposite ends thereof are connected to adjustable brackets 82 and 83, respectively. The springs 80 and 81 maintain the pulley 62 in neutral position, that is, out of engagement with either the pulley 58 or the pulley 66.

The frame members 30, 31 and 32 are provided with a plurality of relatively spaced bearings 84 in which are journalled rollers 85. Positioned intermediate of alternate pairs of the rollers 85 are transversely extending supporting bars 86 which support U-shaped track sections 87. See Fig. 14. The track sections receive and guide a cable 88 that is trained over a pulley 89 mounted on a shaft 90 at the forward end of the frame 20, and a pulley 91 mounted on a shaft 92 at the rear end of the frame 20.

Viewing Fig. 17, it will be noted that the shaft 92 of the pulley 91 is mounted in bearings 93 on the ends of adjustable screws 94 which are mounted in the V-shaped cross member 36, and nuts 95 positioned on the screws 94 on opposite side of the V-shaped member 36 will retain the screws 94 in adjusted relation to the V-shaped member 36. The shaft 90 of the pulley 89 is mounted in the frame similarly to the shaft 92. The opposite ends of the cable 88 are connected to the opposite ends of the saw mill carriage 98. The cable is positioned in an elongated guideway 99 (Fig. 15) in the bottom of the saw mill carriage 98, and the ends of the cable are fastened as at 100 and 101 within the guideway 99. The guideway 99 is adapted to coincide with the tracks 87 to maintain the saw mill carriage 98 in longitudinal alinement with the circular saw 50 which travels in an elongated slot 102 in the saw mill carriage 98 and the gauge frame 104 (Fig. 14) is positioned on the saw mill carriage 98 in abutting relation to the reinforcing bar 103 (Fig. 15).

The cable 88 is wound on the shaft 70 in such a manner that upon rotation of the pulley 71 by means of the belt drive 72 the direction of rotation of the pulley 71 will be regulated as previously described by movement of the pulley 62 to cause the saw mill carriage 98 to travel back and forth over the rollers 85. A blower 105 (Figs. 3 and 5) having an outlet nozzle 106 is mounted on transversely extending bars 107 and 108 that are secured to the longitudinally extending frame members 21 and 22. The shaft 53 controls the rotation of the blower 105 to dispose of sawdust caused by the cutting of the lumber by the circular saw 50.

Viewing Figs. 10, 11 and 13, it will be noted that an elongated rectangular shaped frame 109 is mounted intermediately of a pair of supporting bars 86, and slidably mounted within the frame 109 is an elongated bar 110 which is provided on one end with a vertically disposed L-shaped supporting member 111 in which is mounted a shaft 112 for the gauge wheel 113. The gauge wheel 113 extends over the saw mill carriage 98 and an elongated screw rod 114 threadably mounted within the elongated bar 110 will cause the rotation and extension of the bar 110 within the housing 109 by means of a crank 115 secured to the outer end of the screw rod 114. The screw rod 114 has a cog wheel 116 fixed thereto so that a ratchet 117 pivotally mounted on the handle 115 at 118 will engage the cog wheel 116 to rotate the screw rod 114 in either direction. Thus, the operator does not have to make a complete rotation of the handle 115 to adjust the gauge wheel 113 with relation to the circular saw 50 to cut lumber of various widths. A thickness gauge 119 (Fig. 11) is secured as at 120 to the end of the bar 110 opposite to the handle 115 so that the gauge end 121 of the gauge 119 will coincide with the thickness markings 122 on the upper surface of the housing 109.

Viewing Figs. 2 and 19, it will be seen that thickness measurements 123 in inches are positioned on the upper surface of the saw mill carriage 98 to measure the cut of timber that is not controlled by means of the gauge wheel 113.

Supported on the member 31 and extending for approximately the same length thereof is a saw mill table 124 which is used in the conventional manner during the sawing of the lumber.

In the operation of the mill, power is supplied to the drive pulley 49 for rotation of the circular saw 50. As previously stated, the power may be supplied by the power take-off of a tractor, a stationary gasoline engine, or any other similar source of motivating power that is available to the operator of the saw mill. Timber may be positioned on that portion of the saw mill carriage carrying the markings 123 for the proper cutting thereof and lumber cut from the timber is positioned on that portion of the saw mill carriage underlying the gauge wheel 113.

There has thus been provided a saw mill that is portable and is adapted to cut timber and lumber as desired by the operator, and it is believed from the foregoing description that the operation and construction of the saw mill embodying the invention will be clear to those skilled in the art. It is also to be understood that changes in the minor details of construction, arrangement and combination of parts may be restored to provided they fall within the spirit of the invention and the scope of the appended claim.

Having thus described the invention what is claimed as new and desired to be secured by Letters Patent is:

In a device of the character described, including a saw table, the provision of a thickness gauge comprising a transversely extending hollow frame mounted on said table and having rectangular cross sectional area, a bar slidable in said frame and having similar cross sectional area, said bar extending outwardly of one end of said frame and terminating in an upwardly and inwardly directed inverted L-shaped supporting member, a shaft vertically dependent from said supporting member, a gauge wheel mounted on said shaft, a threaded shaft extending into the other end of said frame and threadably connected to the inner end of said rod, a cog wheel affixed to said threaded shaft, a handle rotatably mounted on said threaded shaft adjacent said cog wheel, and a ratchet pivoted upon said handle and provided with a pair of teeth selectively engageable with said cog wheel.

References Cited in the file of this patent

UNITED STATES PATENTS

| | | |
|---|---|---|
| 216,161 | Dunn | June 3, 1871 |
| 456,364 | Luger | July 21, 1891 |
| 606,041 | Allen et al. | June 21, 1898 |
| 656,168 | Carroll | Aug. 21, 1900 |
| 695,194 | Carney | Mar. 11, 1902 |
| 719,585 | Hanssler | Feb. 3, 1903 |
| 726,165 | Hunt | Apr. 21, 1903 |
| 1,075,918 | Kaylor | Oct. 14, 1913 |
| 1,089,141 | Martin et al. | Mar. 3, 1914 |
| 1,842,114 | Pratt | Jan. 19, 1932 |
| 2,073,407 | Knapp | Mar. 9, 1937 |
| 2,377,236 | Jackson | May 29, 1945 |
| 2,613,702 | Munson | Oct. 14, 1952 |

FOREIGN PATENTS

| | | |
|---|---|---|
| 66,561 | Denmark | Apr. 5, 1948 |